US011385058B2

(12) United States Patent
Prabhakar (10) Patent No.: US 11,385,058 B2
(45) Date of Patent: Jul. 12, 2022

(54) SYSTEMS, VEHICLES, AND METHODS FOR DETECTING AND MAPPING OFF-ROAD OBSTACLES (71) Applicant: Toyota Motor Engineering & Manufacturing North America, Inc., Plano, TX (US)

(72) Inventor: Varun J. Prabhakar, Saline, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 103 days.

(21) Appl. No.: 16/695,892

(22) Filed: Nov. 26, 2019

(65) Prior Publication Data
US 2021/0156688 A1 May 27, 2021

(51) Int. Cl.
G01C 21/00 (2006.01)
G01C 21/20 (2006.01)
G08G 1/0962 (2006.01)
G08G 1/16 (2006.01)
H04L 67/12 (2022.01)

(52) U.S. Cl.
CPC .......... *G01C 21/005* (2013.01); *G01C 21/20* (2013.01); *G08G 1/09626* (2013.01); *G08G 1/165* (2013.01); *H04L 67/12* (2013.01)

(58) Field of Classification Search
CPC .. G01C 21/005; G01C 21/20; G08G 1/09626; G08G 1/165; H04L 67/12
See application file for complete search history.

(56) References Cited

U.S. PATENT DOCUMENTS 5,659,476 A * 8/1997 LeFebvre ........... G01C 21/3415
701/417
6,487,495 B1 * 11/2002 Gale .................. G01C 21/3611
701/461
7,571,029 B2 8/2009 Dai et al.
(Continued)

OTHER PUBLICATIONS

Angelini, et al., "Mapping City Potholes", https://web.wpi.edu/Pubs/E-project/Available/E-project-042706-141742/unrestricted/Final_Pothole_Report.pdf, Apr. 2006.
(Continued)

*Primary Examiner* — Joseph H Feild
*Assistant Examiner* — Rufus C Point
(74) *Attorney, Agent, or Firm* — Dinsmore & Shohl LLP (57) ABSTRACT A system for detecting and mapping off-road obstacles within a vicinity of a vehicle includes one or more processors, one or more location sensors, a display, one or more off-road obstacle detection sensors, and one or more memory modules. The one or more location sensors output a location signal indicative of the location of the vehicle. The display displays map data of the location of the vehicle. The one or more off-road obstacle detection sensors output an obstacle signal indicative of a location of an obstacle. The one or more memory modules store logic that when executed by the one or more processors cause the system to determine whether the vehicle is off-road, detect the obstacle in the vicinity of the vehicle in response to determining that the vehicle is off-road, and generate and display a map indicator on the display corresponding to the location of the obstacle.

20 Claims, 6 Drawing Sheets

(56) References Cited

U.S. PATENT DOCUMENTS

| | | | |
|---|---|---|---|
| 8,020,657 B2* | 9/2011 | Allard | G05D 1/0088 |
| | | | 180/167 |
| 8,346,480 B2 | 1/2013 | Trepagnier et al. | |
| 8,831,869 B2 | 9/2014 | Bai et al. | |
| 8,996,249 B2 | 3/2015 | Lu et al. | |
| 9,201,421 B1* | 12/2015 | Fairfield | G06V 20/58 |
| 9,365,217 B2 | 6/2016 | Bridgers et al. | |
| 9,949,431 B2* | 4/2018 | Willgert | A01D 75/185 |
| 10,543,741 B2* | 1/2020 | Biderman | B60L 15/2009 |
| 10,761,542 B1* | 9/2020 | Fairfield | G05D 1/0038 |
| 2003/0060971 A1* | 3/2003 | Millington | G01C 21/3632 |
| | | | 701/454 |
| 2003/0139880 A1* | 7/2003 | Leimbach | G01C 21/005 |
| | | | 701/495 |
| 2007/0193798 A1* | 8/2007 | Allard | G05B 19/414 |
| | | | 180/169 |
| 2007/0219720 A1* | 9/2007 | Trepagnier | G05D 1/0278 |
| | | | 701/300 |
| 2010/0063673 A1* | 3/2010 | Anderson | G05D 1/00 |
| | | | 701/1 |
| 2015/0025755 A1* | 1/2015 | Willgert | A01D 34/008 |
| | | | 701/50 |
| 2015/0254986 A1* | 9/2015 | Fairfield | G05D 1/0287 |
| | | | 707/687 |
| 2017/0017734 A1 | 1/2017 | Groh et al. | |
| 2017/0176990 A1* | 6/2017 | Keller | G01S 17/42 |
| 2017/0197679 A1* | 7/2017 | Scaringe | B60K 1/02 |
| 2017/0320495 A1* | 11/2017 | Lu | B60W 10/22 |
| 2017/0357267 A1* | 12/2017 | Foster | G05D 1/0274 |
| 2018/0074493 A1* | 3/2018 | Prokhorov | B60W 30/00 |
| 2018/0245315 A1* | 8/2018 | Kaiso | E02F 9/24 |
| 2018/0245929 A1* | 8/2018 | Watanabe | H04W 4/44 |
| 2018/0314900 A1* | 11/2018 | Kawamoto | G05D 1/0246 |
| 2019/0199946 A1* | 6/2019 | Wendel | H04N 5/3452 |
| 2019/0212745 A1* | 7/2019 | Wendt | G05D 1/024 |
| 2020/0193172 A1* | 6/2020 | Kawamoto | G05D 1/0274 |
| 2021/0094537 A1* | 4/2021 | Mahnken | G01S 17/86 |

OTHER PUBLICATIONS

Timofte, et al., "Multi-view Manhole Detection, Recognition, and 3D Localisation", https://www.researchgate.net/publication/221429902_Multi-view_manhole_detection_recognition_and_3D_localisation, Nov. 2011.

\* cited by examiner

SYSTEMS, VEHICLES, AND METHODS FOR DETECTING AND MAPPING OFF-ROAD OBSTACLES

TECHNICAL FIELD

The present specification generally relates to the detection of off-road obstacles and, more specifically, to systems, vehicles, and methods for detecting and mapping off-road obstacles.

BACKGROUND

During off-roading activities, drivers of off-roading vehicles find and traverse obstacles in locations sometimes far from any recognized roads. Such obstacles may include hills, rocks, streams, etc. Currently, GPS map information for vehicles merely depicts road networks without depicting such off-road obstacles. However, vehicle drivers may want information related to a location of the obstacle and/or performance of the vehicle during traversal of the obstacle.

Accordingly, a need exists for alternative systems, vehicles, and methods for detecting and mapping off-road obstacles.

SUMMARY

In one embodiment, a system for detecting and mapping off-road obstacles within a vicinity of a vehicle includes one or more processors, one or more location sensors, a display, one or more off-road obstacle detection sensors, and one or more memory modules. The one or more location sensors are communicatively coupled to the one or more processors and are configured to output a location signal indicative of a location of the vehicle. The display is communicatively coupled to the one or more processors and is operable to display map data of the location of the vehicle. The one or more off-road obstacle detection sensors are communicatively coupled to the one or more processors and are configured to output an obstacle signal indicative of a location of an obstacle. The one or more memory modules store logic that when executed by the one or more processors cause the system to determine, based on the location of the vehicle, whether the vehicle is off-road, detect, based on the obstacle signal from the one or more off-road obstacle detection sensors, the obstacle in the vicinity of the vehicle in response to determining that the vehicle is off-road, generate a map indicator to indicate the obstacle, and display the map indicator on the display corresponding to a location of the obstacle.

In another embodiment, a vehicle for detecting and mapping off-road obstacles includes one or more processors, one or more location sensors, one or more vehicle telematics sensors, a display, one or more off-road obstacle detection sensors, and one or more memory modules. The one or more location sensors are communicatively coupled to the one or more processors and are configured to output a location signal indicative of a location of the vehicle. The one or more vehicle telematics sensors are communicatively coupled to the one or more processors and are configured to output a telematics signal indicative of performance of the vehicle. The display is communicatively coupled to the one or more processors and is operable to display map data of the location of the vehicle. The one or more off-road obstacle detection sensors are communicatively coupled to the one or more processors and are configured to output an obstacle signal indicative of a location of an obstacle. The one or more memory modules are communicatively coupled to the one or more processors and store logic that when executed by the one or more processors cause the system to determine, based on the location of the vehicle, whether the vehicle is off-road, detect, based on the obstacle signal from the one or more off-road obstacle detection sensors, the obstacle in the vicinity of the vehicle in response to determining that the vehicle is off-road, generate a map indicator to indicate the obstacle, display the map indicator on the display corresponding to the location of the obstacle, and store telematics data from the one or more vehicle telematics sensors in the one or more memory modules related to traversal of the obstacle by the vehicle.

In yet another embodiment, a method for detecting and mapping off-road obstacles includes determining a location of a vehicle based on a location signal output by one or more location sensors, detecting, based on an obstacle signal from the one or more off-road obstacle detection sensors, an obstacle in the vicinity of the vehicle in response to determining that the vehicle is off-road, generating a map indicator to indicate the obstacle, and displaying the map indicator on a display corresponding to the location of the obstacle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
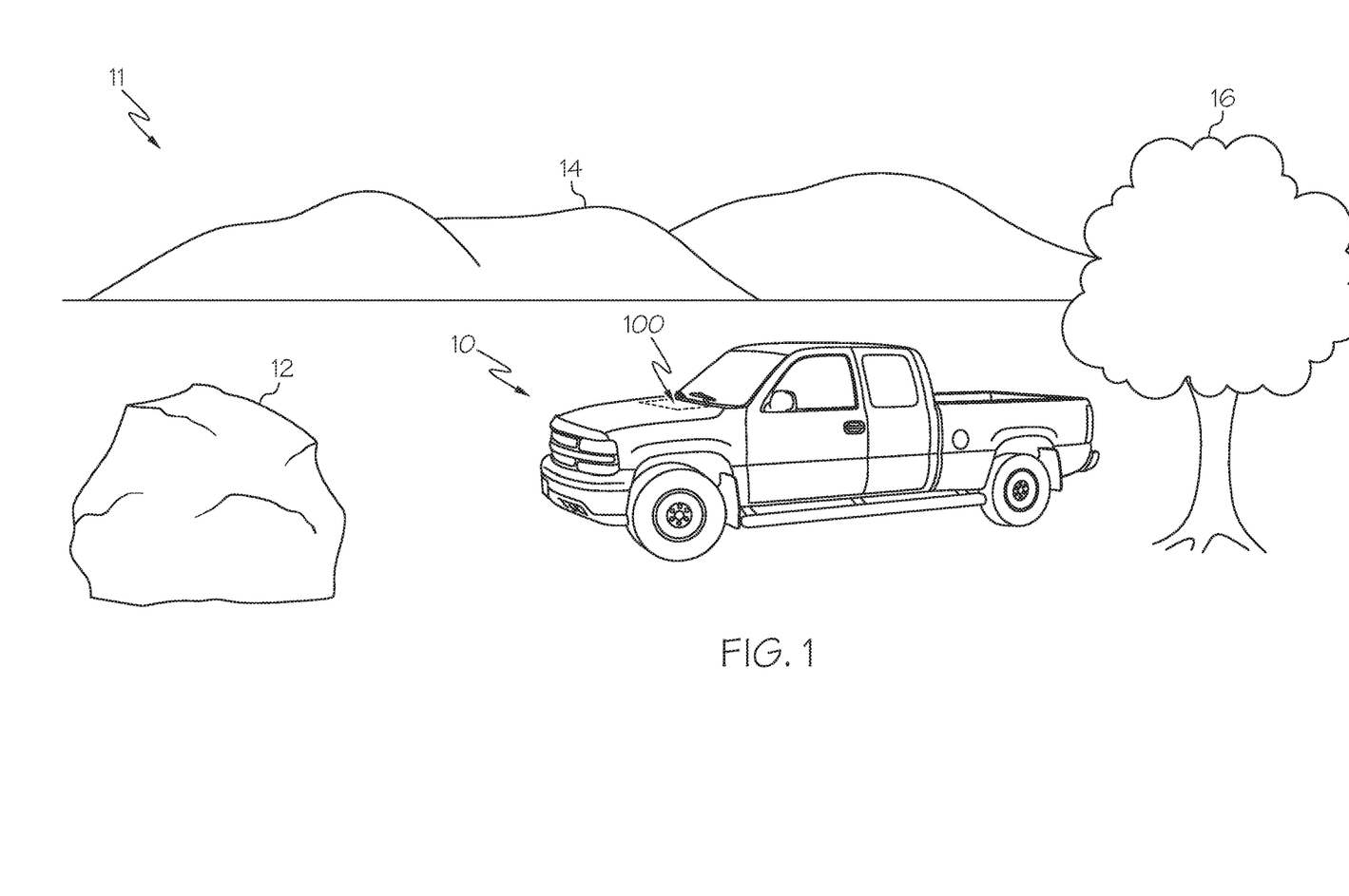
FIG. 1 depicts a vehicle off-roading, according to one or more embodiments shown and described herein.

Generally referring to FIG. 1, a vehicle is depicted in an off-roading environment. The term "off-roading" as used herein refers to the activity or sport of driving a vehicle (e.g., a motor vehicle) over rough terrain away from public roads (e.g., unpaved roads, beaches, trails, or other rough terrain. Vehicles according to the present disclosure include a system for detecting and/or mapping obstacles within a vicinity of the vehicle or within a line of sight (of one or more sensors) of the vehicle. The system generally includes one or more location sensors to determine a location of the vehicle, a display, such as the display of a GPS unit, and one or more off-road obstacle detection sensors. Using the one or more obstacle detection sensors, the system may detect an obstacle, determine a location of the obstacle relative to the vehicle, and place a map indicator on a map displayed on the display to show the location of the obstacle. In some embodiments, such as where the vehicle drives over the obstacle, the system may record vehicle telematics data (e.g., suspension drop/rebound, vehicle inclination, yaw angle, etc.) and associate it with the obstacle. In some embodiments, the obstacle location, the type of obstacle, imagery of the obstacle, and/or vehicle telematics data from traversing the obstacle, may be shared with a remote server or other vehicles such that the obstacle is shown on the map display of other vehicles to allow other vehicles to find the obstacle. These and additional features will be described in greater detail with reference to the figures below.

In particular, FIG. 1 illustrates a vehicle 10 traveling through an off-road environment 11. The off-road environment 11 may include one or more obstacles (e.g., rocks 12, hills 14, trees 16, rivers streams, mounds, etc.) over which the vehicle 10 may travel. Some may be readily apparent to the driver of the vehicle 10 if the obstacle is in the path of the vehicle 10. However, some may not be readily apparent to the driver if the obstacle is not directly in the path of the vehicle 10 (e.g., to the left, right, or behind the vehicle 10). It is noted that while the vehicle 10 is depicted as a truck, the vehicle 10 may be any terrestrial, aquatic, airborne vehicle.

Figure 2:
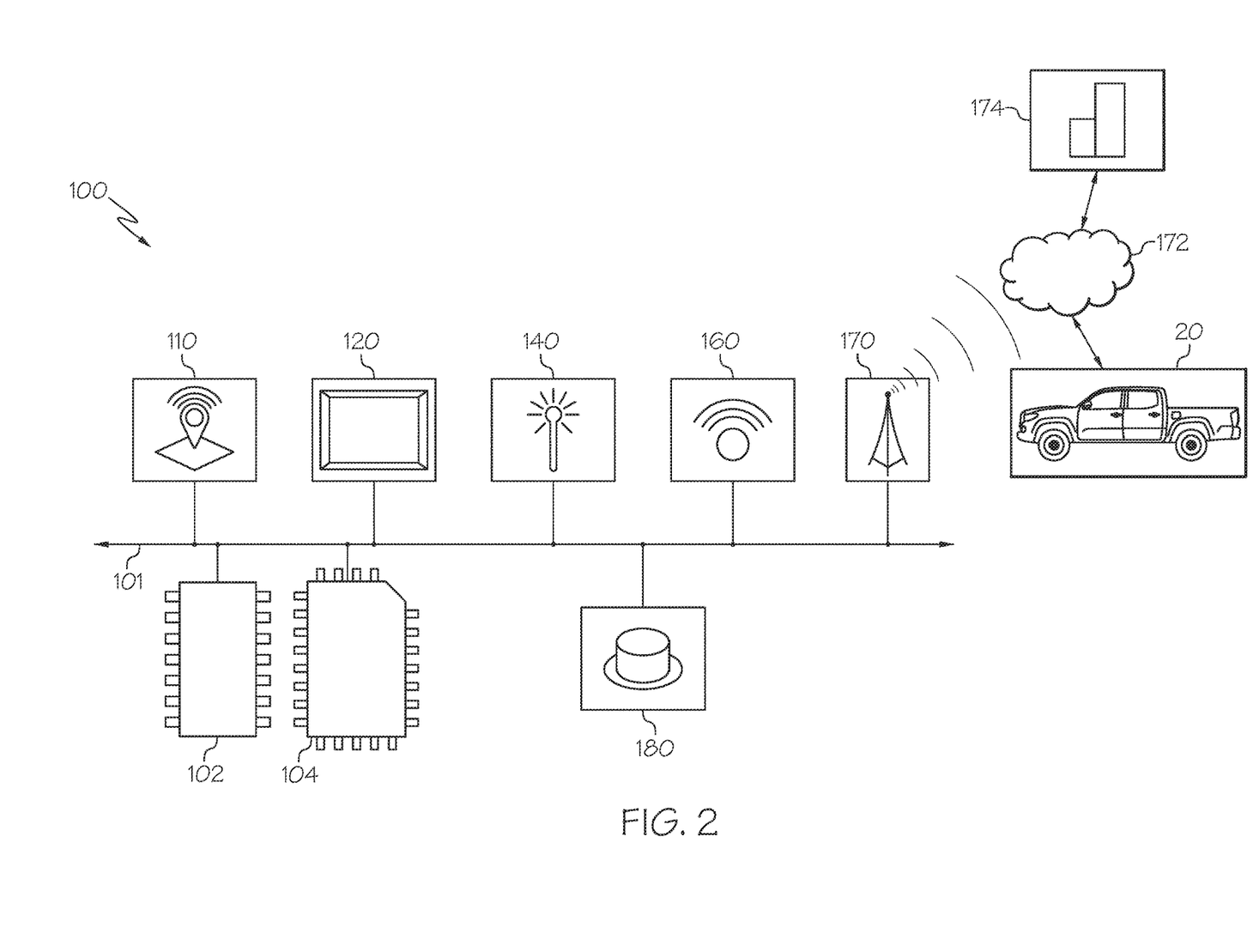
FIG. 2 depicts a system for detecting and mapping off-road obstacles, according to one or more embodiments shown and described herein.

The vehicle 10 includes a system 100 for detecting and mapping off-road obstacles within a vicinity of the vehicle. Referring now to FIG. 2, the system 100 for detecting and mapping off-road obstacles within the vicinity of the vehicle is schematically illustrated. It is noted that the system 100 may be integrally incorporated into the systems of the vehicle or separate therefrom. The system 100 includes a communication path 101, one or more processors 102, one or more memory modules 104, one or more location sensors 110, a display 120, and one or more off-road obstacle detection sensors 140. In some embodiments, the system 100 further includes one or more vehicle telematics sensors 160, one or more user input devices 180, and/or network interface hardware 170. The system 100 may include a greater or fewer number of modules communicatively coupled to one another without departing from the scope of the present disclosure.

As described above, the system 100 includes the communication path 101 that provides data interconnectivity between various modules disposed within the system 100. Specifically, each of the modules can operate as a node that may send and/or receive data. In some embodiments, the communication path 101 includes a conductive material that permits the transmission of electrical data signals to processors, memories, sensors, and actuators throughout the system 100. In another embodiment, the communication path 101 can be a bus, such as for example a LIN bus, a CAN bus, a VAN bus, and the like. In further embodiments, the communication path 101 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

The system 100 includes one or more processors 102 communicatively coupled with one or more memory modules 104. The one or more processors 102 may include any device capable of executing machine-readable instructions stored on a non-transitory computer-readable medium. Accordingly, each processor 102 may include a controller, an integrated circuit, a microchip, a computer, and/or any other computing device.

The one or more memory modules 104 are communicatively coupled to the one or more processors 102 over the communication path 101. The one or more memory modules 104 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the system 100 and/or external to the system 100. The one or more memory modules 104 may be configured to store one or more pieces of logic, as described in more detail below. The embodiments described herein may utilize a distributed computing arrangement to perform any portion of the logic described herein.

Embodiments of the present disclosure include logic stored on the one or more memory modules 104 that includes machine-readable instructions and/or an algorithm written in any programming language of any generation (e.g., 1GL, 2GL, 3GL, 4GL, and/or 5GL) such as, machine language that may be directly executed by the one or more processors 102, assembly language, obstacle-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components.

As noted above, the system 100 further includes one or more location sensors 110 coupled to the communication path 101 such that the communication path 101 communicatively couples the one or more location sensors 110 to other modules of the system 100. The one or more location sensors 110 may be any sensor that outputs a location signal indicative of the location of the vehicle 10. For example, the one or more location sensors 110 may include, but is not limited to, a satellite antenna, a camera, an off-road suspension activation sensor, a wheel slippage sensor, or any combination thereof. Other vehicle performance sensors, which may provide indication into whether or not a vehicle is off-road may include, but are not limited to accelerometers, inclinometers, or the like. Based on the location signal output by the one or more location sensors 110, the one or more processors 102 may determine relevant information about the environment of the vehicle 10 to determine whether or not the vehicle 10 is located on or off-road (e.g., off of a public road or private road).

Figure 3:
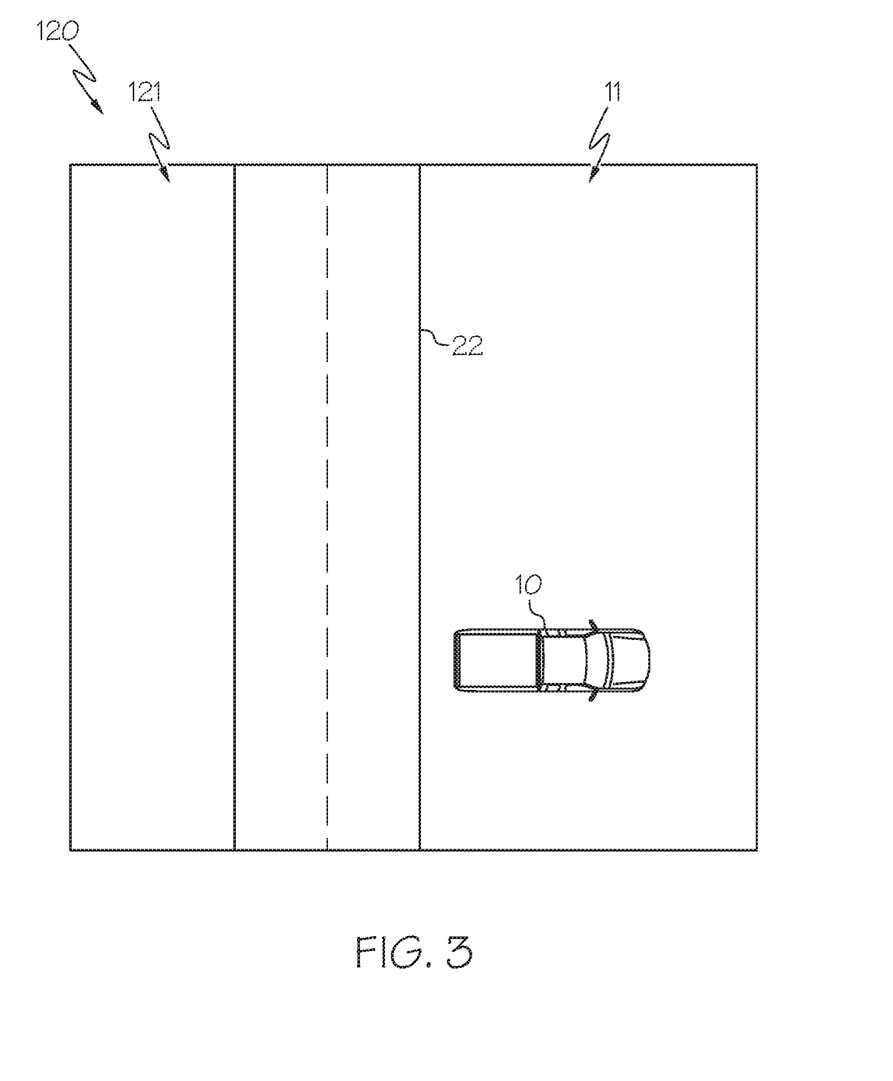
FIG. 3 depicts a display illustrating a vehicle traveling off-road, according to one or more embodiments shown and described herein.

In embodiments, wherein the one or more location sensors 110 include a satellite antenna, the satellite antenna may be configured to receive location signals from GPS satellites. Specifically, in one embodiment, the satellite antenna includes one or more conductive elements that interact with electromagnetic signals transmitted by GPS satellites. The received location signal is transformed into a data signal indicative of the location (e.g., latitude and longitude) of the vehicle 10 by the one or more processors 102. The one or more processors 102 may then correlate the data signal to map information stored on the one or more memory modules 104, received from a remote server 174, or otherwise available to the one or more processors 102 to determine whether vehicle 10 is located off-road. For example, the one or more processors 102 may determine that the vehicle 10 is off-road in cases in which the data signal, upon correlation with the map information, indicates that the vehicle 10 is located more than a predetermined distance from a road 22 as shown in FIG. 3.

In embodiments where the one or more location sensors 110 includes a camera (e.g., a video camera), the location signal output by the camera includes image data. As such, the camera may include any devices having an array of sensing devices capable of capturing image data (e.g., pixels) from an environment of the vehicle 10 and may have any resolution. The one or more processors 102 may execute logic stored on the one or more memory modules 104 to perform image recognition on the received image data captured by one or more vehicle 10 cameras. For example, the one or more memory modules 104 may include an image recognition database or algorithm to allow the one or more processors 102 road lines, pavement, etc., and determine whether the vehicle 10 has driven off of the road to determine that the vehicle 10 is off-road.

In embodiments where the one or more location sensors 110 includes an off-road suspension activation sensor, the vehicle 10 may be equipped with an off-road suspension configuration in which the vehicle 10 may be selectively placed based on input by a user (e.g., through a switch, button, touchscreen, or the like). For example, the off-road suspension configuration may optimize vehicle characteristics (e.g., throttle, brakes, suspension settings, etc.) for traveling over rough and/or challenging terrain. Operation by a user may trigger output by the off-road suspension activation sensor, which when received by the processor 102 causes the processor 102 to execute logic to determine that the vehicle 10 is off-road.

In embodiments wherein the one or more location sensors 110 include a wheel slippage sensor, the wheel slippage sensor may output a signal indicative of an amount of wheel slippage experienced by the vehicle 10. An increased level of wheel slippage (e.g., spinning of the vehicle wheel without forward movement) may be indicative of the vehicle 10 driving off-road (e.g., slippage may be caused by loose soil, uneven driving surfaces, or the like). Where the one or more processors 102 receive the wheel slippage signal from the wheel slippage sensor, the one or more processors 102 may execute logic determine that the vehicle 10 is driving in an off-road environment.

Referring still to FIG. 2, the system 100 includes the display 120 for providing visual output such as, for example, maps, navigation, entertainment, information, or a combination thereof. For example, the display 120 may be integrated into a vehicle 10 infotainment system and display 120 map information and the location of the vehicle 10 to the user. The display 120 may be coupled to the communication path 101. Accordingly, the communication path 101 communicatively couples the display 120 to other modules of the system 100. The display 120 may include any medium capable of transmitting an optical output such as, for example, a cathode ray tube, light emitting diodes, a liquid crystal display, a plasma display, or the like. Moreover, the display 120 may be a touchscreen that, in addition to providing optical information, detects the presence and location of a tactile input upon a surface of or adjacent to the display 120. Accordingly, the display 120 may be included as the user input device 180 and may receive mechanical input directly upon the optical output provided by the display 120. Additionally, it is noted that the display 120 can include at least one of the one or more processors 102 and the one or more memory modules 104.

Referring to FIG. 3, the display 120 is shown depicting map data 121 of a location of the vehicle 10. The vehicle 10 is illustrated on the display 120 of a virtual representation of the location of the vehicle 10 on the map data 121. In the illustrated example, the one or more processors 102, based on the location signal received from the one or more location sensors 110, may determine that the location of the vehicle 10 is off-road. As will be described further below, in response to detecting that the vehicle 10 is off-road, the system 100 is configured to detect obstacles within the vicinity of the vehicle 10 in response to determining that the location of the vehicle 10 is off-road.

Accordingly, and as noted above, the system 100 as illustrated in FIG. 2 includes the one or more off-road obstacle detection sensors 140. The off-road obstacle detection sensors 140 may be communicatively coupled to the one or more processors 102 over the communication path 101. The one or more off-road obstacle detection sensors 140 may include any sensor configured to output an obstacle signal indicative of the presence of an obstacle within a vicinity of the vehicle 10. Additionally, the one or more off-road obstacle detection sensors 140 are configured to allow the one or more processors 102 to determine an approximate location of the detected obstacle relative to the location of the vehicle 10. The one or more off-road obstacle detection sensors 140 may include, but are not limited to, a LiDAR sensor, a SONAR sensor, a camera, a proximity sensor, or any combination thereof. Additionally, and as noted above, the one or more off-road obstacle detection sensors 140 may detect potential off-road obstacles anywhere in the vicinity in the vehicle 10. As used herein, the phrase "vicinity of the vehicle" refers to any distance from the vehicle within a sensing range of the one or more off-road obstacle detection sensors 140. Additionally, the one or more off-road obstacle detection sensors 140 may be configured to detect obstacles 360° around the vehicle 10 (e.g., forward, rearward, or to any side of the vehicle 10). Accordingly, obstacles that may not be readily apparent to the driver of the vehicle 10 may be detected.

In embodiments where the off-road obstacle detection sensors 140 includes a camera (e.g., video camera), the obstacle signal output by the camera includes image data. As such, the camera may include any devices having an array of sensing devices capable of capturing image data (e.g., pixels) from an environment of the vehicle 10 and may have any resolution. The one or more processors 102 may execute logic stored on the one or more memory modules 104 to perform image recognition on the received image data captured by the camera. For example, the one or more memory modules 104 may include an image recognition database or algorithm to allow the one or more processors 102 to recognize different types of obstacles (e.g., rocks 12, hills 14, mounds, streams, rivers, trees 16, etc.).

Figure 4:
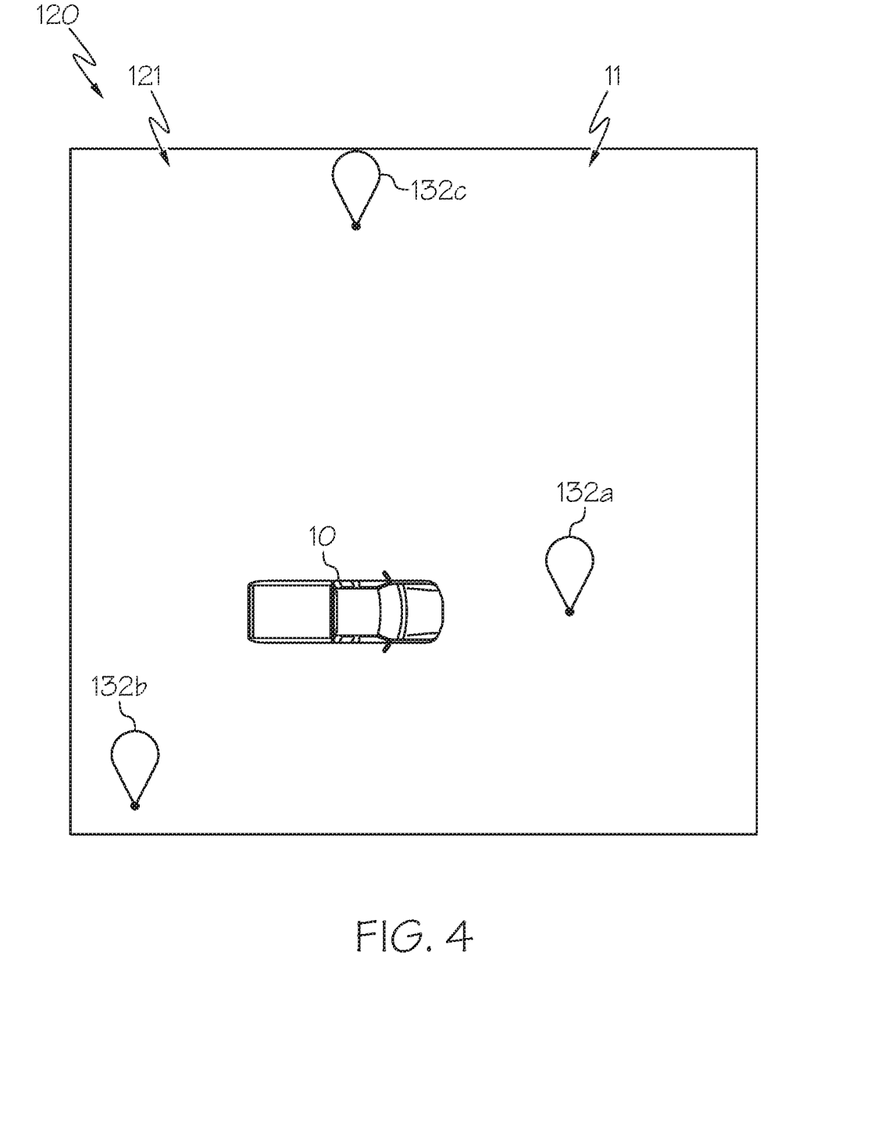
FIG. 4 depicts a map indicator generated on the display of FIG. 3, according to one or more embodiments shown and described herein.

Upon detection of the obstacle with the one or more off-road obstacle detection sensors 140, the one or more processors 102 execute logic to generate a map indicator to indicate the detected obstacle and display, on the display 120, the map indicator at a position corresponding to a location of the detected obstacle. For example, and as illustrated in FIG. 4, the display 120 illustrates map data 121, wherein the vehicle 10 is virtually represented and shown off-road (e.g., away from the road 22, shown in FIG. 3, in an off-road environment 11). A plurality of map indicators 132*a*, 132*b*, and 132*c* are illustrated on the map data 121 at approximate locations of a detected obstacle relative to the vehicle 10. That is, the one or more processors 102 may determine based on the signal provided by the one or more off-road obstacle detection sensors 140 the approximate position (e.g., GPS coordinates) of an obstacle relative to the vehicle 10. For example, and with reference to FIG. 1, a first obstacle, a rock 12, is illustrated in front of the vehicle 10. Based on the obstacle signal from the one or more off-road obstacle detection sensors 140, the system 100 detects the rock 12, estimates a location of the rock 12 relative to the vehicle 10, and, as illustrated in FIG. 4, generates a map indicator 132*a* to indicate the rock 12, and displays the map indicator 132*a* on the map data 121 displayed on the display 120 corresponding to a location of the rock 12 relative to the vehicle 10.

As noted above, when the vehicle 10 is determined to be off-road, based on the location signal received from the one or more location sensors 110, obstacles anywhere within a sensing range of the one or more off-road obstacle detection sensors 140 may be detected including obstacles behind or to the sides of the vehicle 10. For example, referring again to FIG. 1, a tree 16 is positioned behind and to the side of a travel direction of the vehicle 10. Based on the obstacle signal from the one or more off-road obstacle detection sensors 140, the system 100 detects the tree 16, estimates a location of the tree 16 relative to the vehicle 10, and, as shown in FIG. 4, generates a map indicator 132*b* to indicate the tree 16, and displays the map indicator 132*b* corresponding to the tree 16 on the map data 121 in a location corresponding to a location of the tree 16 relative to the vehicle 10. Similarly, and with reference to FIG. 1, a hill 14 is shown in the distance to a side of the vehicle 10. Based on the obstacle signal from the one or more off-road obstacle detection sensors 140, the system 100 detects the hill 14, estimates a location of the hill 14 relative to the vehicle 10, and, as illustrated in FIG. 4, generates a map indicator 132*c* to indicate the hill 14, and displays the map indicator 132*c* corresponding to the hill 14 on the map data 121 in a location corresponding to a location of the hill 14 relative to the vehicle 10.

The map indicators 132*a*, 132*b*, 132*c* may be any virtual representation of the obstacle that may be displayed on the map data 121 of the display 120. For example, the map indicator 132*a* may be a pin, balloon, star, square, circle, or any other representative image of an obstacle. In some embodiments, such as where the one or more off-road obstacle detection sensors 140 include a camera, the one or more processors 102 may execute logic to cause the system 100 to capture image data of the detected obstacle. The image data may be stored in the one or more memory modules 104 and encoded to the map indicator for later recall of the obstacle should the user wish to view the obstacle. In some embodiments, the image data may be used as the map indicator. In some embodiments, such as where obstacle recognition is performed to determine a type of obstacle, the map indicator may have a representative shape of the detected type of obstacle (e.g., tree-shaped, hill-shaped, rock-shaped, etc.).

Figure 5:
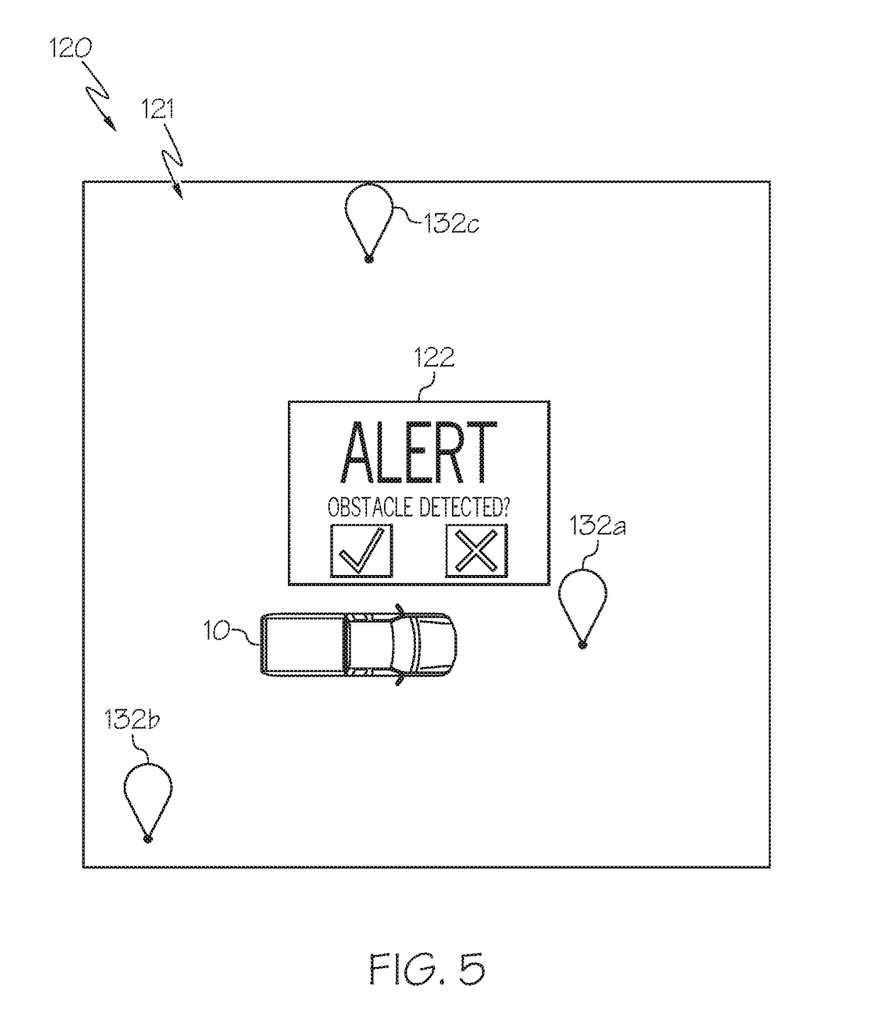
FIG. 5 depicts an prompt on the display of FIG. 3, according to one or more embodiments shown and described herein.

In embodiments, the one or more processors 102 may upon detection of an obstacle output a notification to alert the user to the presence of the detected obstacle. For example, the one or more processors 102 may execute logic to generate and output a visual prompt 122 with the display 120, such as illustrated in FIG. 5. The prompt 122 may request that the user confirm the presence of the obstacle. In some embodiments, the notification may include an audible alert (e.g., a chime, ring, verbal alert, or the like) issued, for example, through a vehicle speaker system (not shown).

A confirmation by the user as to the presence of the obstacle may be made through the one or more user input devices 180. As illustrated in FIG. 2, the one or more user input devices 180 may be communicatively coupled to the one or more processors 102 over the communication path 101. The one or more user input devices 180 may include any device or combination of devices for user interaction with the system 100. For example, the one or more user input devices 180 may include, but are not limited to, any combination of buttons, toggles, knobs, switches, joy sticks, microphones (e.g., for inputting voice commands into the system 100), touch screens, or the like. Additionally, using the one or more user input devices 180 may allow the user to indicate a type of obstacle and/or confirm the type of obstacle as determined by the one or more processors 102. It is contemplated that in some embodiments, whether or not the system 100 determines the vehicle 10 to be off-road, a user may cause the vehicle to do off-road obstacle detection using the one or more user input devices 180 to command the system 100 to detect off-road obstacles.

While traversing obstacles during off-roading activity, a user might want to know about the performance of the vehicle 10. Performance metrics may include, but are not limited to suspension drop/rebound, vehicle inclination, acceleration, yaw angle, wheel slippage, etc. As noted hereinabove, and with reference to FIG. 2, the system 100 may further include one or more vehicle telematics sensors 160 communicatively coupled to the one or more processors 102. For example, the one or more vehicle telematics sensors 160 may be communicatively coupled to the one or more processors 102 by the communication path 101. The one or more vehicle telematics sensors 160 are configured to output a telematics signal indicative of performance of the vehicle 10. The one or more processors 102 may receive the telematics signal from the one or more vehicle telematics sensors 160 and store telematics data from the one or more vehicle telematics sensors 160 in the one or more memory modules 104 related to traversal of a detected obstacle by the vehicle 10. The telematics data may be linked to the map indicator and encoded therewith.

A user wanting to view the telematics data may select the map indicator (e.g., 132*a*, 132*b*, 132*c*) with the one or more user input devices 180 to view the vehicle 10 telematics data corresponding to the traversal of the particular obstacle. The one or more vehicle telematics sensors 160 may include, but are not limited to, accelerometers, inclinometers, wheel slippage sensors, suspension rebound sensors, yaw angle sensors, engine power sensors, timers, or any combination thereof.

Referring again to FIG. 2, the system 100 may further include the network interface hardware 170 for communicatively coupling the system 100 with a network 172. The network interface hardware 170 can be communicatively coupled to the communication path 101 and can be any device capable of transmitting and/or receiving data via the network 172. Accordingly, the network interface hardware 170 may include a communication transceiver for sending and/or receiving any wired or wireless communication. For example, the network interface hardware 170 may include an antenna, a modem, LAN port, Wi-Fi card, WiMax card, mobile communications hardware, near-field communication hardware, satellite communication hardware, and/or any wired or wireless hardware for communicating with other networks and/or devices.

The system 100 may communicate, through the network interface hardware 170, with the network 172 to communicatively couple the system 100 with the remote server 174. For example, the remote server 174 may receive location information, image data, and/or vehicle telematics data of the detected obstacle. In some embodiments, the one or more processors 102 may automatically communicate such information to the remote server 174. The remote server 174 may them communicate such information with other vehicles 20 such that other vehicle operators may find and traverse the obstacle. That is, the remote server 174 may automatically update map information provided to the vehicle 10 and/or the other vehicles 20 from the remote server 174 to include detected obstacle information (e.g., location information, vehicle telematics data, and/or image data). Additionally, information may be accumulated over time from the vehicle 10 or other vehicles 20, which may indicate changes to the obstacle (e.g., erosion).

In further embodiments, the network 172 may include one or more computer networks (e.g., a personal area network, a local area network, or a wide area network), cellular networks, satellite networks and/or a global positioning system and combinations thereof. Accordingly, the system 100 may be communicatively coupled to the network 172 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

While it is contemplated that the system 100 may communicate automatically and constantly with the network 172. In some embodiments, the system 100 may only periodically transmit data through the network 172. For example, the system 100 may only transmit data when the vehicle 10 is located and connected to WiFi or is in range of a cellular tower or located in range of a data off-load center (e.g., tower, other vehicle, etc.). Accordingly, the system 100 may locally store obstacle data until the data can be off-loaded to the remote server 174 through the network 172.

In some embodiments, the system 100 includes the network interface hardware 170 for communicatively coupling the one or more processors 102 to other vehicles 20 such that obstacle data (e.g., type, location, image, and/or telematics data) may be received from and sent to other vehicles 20 configured with vehicle-to-vehicle communication. For instance, the vehicle 10 and the other vehicles 20 may communicate with one another to send and receive information relevant obstacle data to one another. The map data 121 on the vehicle 10 and the other vehicles 20 may be updated accordingly in response to receive of obstacle data. This may be particularly useful for the vehicle 10 and the other vehicles 20 traveling together in a convoy.

Figure 6:
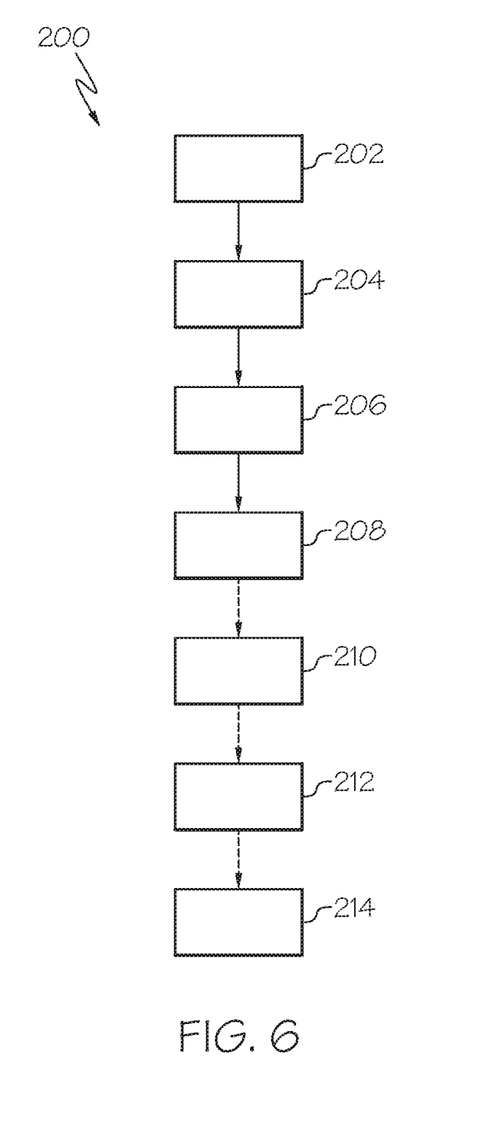
FIG. 6 depicts a flowchart illustrating a method for detecting and mapping off-road obstacles, according to one or more embodiments shown and described herein.

Referring now to FIG. 6, a flowchart depicting a method 200 for detecting and mapping off-road obstacles is shown. It is noted that though a finite number of steps are shown, a greater or fewer number of steps, in any order, may be included without departing from the scope of the present disclosure. At step 202 the method 200 includes determining a location of the vehicle 10 based on the location signal output by the one or more location sensors 110. In particular, and as noted above, the location of the vehicle 10 may be determined by the one or more processors 102 using GPS coordinates, wheel slippage, object recognition (e.g., recognizing the vehicle 10 has left the road), or the like. In response to determining that the vehicle 10 is "off-road," step 204 includes detecting, based on the obstacle signal output by the one or more off-road obstacle detection sensors 140, an obstacle in the vicinity of the vehicle 10. For example, the system 100 may scan the environment around the vehicle 10 with the one or more off-road obstacle detection sensors 140 to detect obstacles within the sensing range of the one or more off-road obstacle detection sensors 140. In some embodiments, the step 204 of detecting an obstacle with the one or more off-road obstacle detection sensors 140 may include determining a type of obstacle, e.g., through obstacle recognition performed on captured image data of the obstacle. As noted above, in some embodiments, the system 100 may be manually activated by a user without recognition of the location of the vehicle 10.

At step 206, the method 200 further includes generating a map indicator to indicate the detected obstacle. As noted herein above, the map indicator may be any virtual representation of the obstacle that may be displayed on the map data 121 of the display 120. Accordingly, the method 200 further includes the step 208 of displaying the map indicator on the display 120 at a position corresponding to a location of the detected obstacle relative to the vehicle 10, such as illustrated in FIG. 4. That is for each obstacle detected, the map indicator 132a, 132b, 132c, etc., may be generated and displayed on the display 120 at an approximate location of the obstacle relative to the vehicle 10.

In some embodiments, and as noted above, the method 200 may further include storing vehicle telematics data relevant to the vehicle 10 traversing a detected obstacle (step 210). For example, the one or more processors 102 may receive a vehicle telematics signal from the one or more vehicle telematics sensors 160 and detect vehicle 10 performance characteristics related to the vehicle 10 traversing the detected obstacle. This information may be stored in the one or more memory modules 104 (and or by the remote server 174) for later recall by the user.

In some embodiments, the method 200 may further include communicating information about the detected obstacle such as type, location, vehicle telematics data, or the like to the remote server 174 through the network interface hardware 170 or to other vehicles 20 (step 212) through, e.g., vehicle-to-vehicle communication. This may allow for the obstacle to be displayed on map data 121 other vehicle displays.

The method 200 may further include a step 214 of outputting a notification to the user, for example, with the display 120 and or an audible alert, to indicate to the user that an obstacle has been detected). In some embodiments, the notification may include a visual prompt such as illustrated in FIG. 5, which prompts the user to confirm at least one of a presence of the obstacle and/a type of the obstacle. In some embodiments, and as noted above, it is contemplated that the user may be prompted to provide an identification of the type of obstacle.

It should now be understood that vehicles systems and methods as described herein are directed to detecting and mapping off-road obstacles. For example, vehicles according to the present disclosure include a system for detecting and/or mapping obstacles within a vicinity of the vehicle or within a line of sight (of one or more sensors) of the vehicle. The system generally includes one or more location sensors to determine a location of the vehicle, a display, such as the display of a GPS unit, and one or more off-road obstacle detection sensors. Using the one or more off-road obstacle detection sensors, the system may detect an obstacle, determine a location of the obstacle relative to the vehicle, and place a map indicator on a map displayed on the display to show the location of the obstacle. In some embodiments, such as where the vehicle drives over the obstacle, the system may record vehicle telematics data (e.g., suspension drop/rebound, vehicle inclination, yaw angle, etc.) and associate it with the obstacle. In some embodiments, the obstacle location, type, image data, and/or vehicle telematics data, may be shared with a remote server or other vehicles such that the obstacle is shown on the map display of other vehicles to allow other vehicles to find the obstacle.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for detecting and mapping off-road obstacles within a vicinity of a vehicle, the system comprising:
   one or more processors;
   one or more location sensors communicatively coupled to the one or more processors and configured to output a location signal indicative of a location of the vehicle;
   a display communicatively coupled to the one or more processors and operable to display map data of the location of the vehicle;
   one or more off-road obstacle detection sensors communicatively coupled to the one or more processors and configured to output an obstacle signal indicative of a location of an obstacle;
   one or more memory modules communicatively coupled to the one or more processors and that store logic that when executed by the one or more processors cause the system to:
     receive the map data of the location of the vehicle;
     determine, based on the location of the vehicle, whether the vehicle is off-road;
     detect, based on the obstacle signal from the one or more off-road obstacle detection sensors, the obstacle in the vicinity of the vehicle in response to determining that the vehicle is off-road;
     determine, based on the obstacle signal, the location of the obstacle relative to the vehicle;
     generate a map indicator to indicate the obstacle;
     position the map indicator on the map data corresponding to the location of the obstacle;
     display a prompt on the display requesting that a user confirm presence of the obstacle; and
     display the map indicator on the display corresponding to the location of the obstacle in response to the user confirming the presence of the obstacle.

2. The system of claim 1, wherein the logic executed by the one or more processors further cause the system to identify a type of the obstacle detected.

3. The system of claim 2, wherein the map indicator further indicates the type of the obstacle detected.

4. The system of claim 1, further comprising network interface hardware communicatively coupled to the one or more processors, wherein the logic executed by the one or more processors causes the system to communicate location information of the obstacle to a remote server.

5. The system of claim 1, further comprising network interface hardware communicatively coupled to the one or more processors, wherein the logic executed by the one or more processors causes the system to communicate location information of the obstacle through vehicle-to-vehicle communication.

6. The system of claim 1, wherein the one or more off-road obstacle detection sensors is at least one of a LiDAR sensor, a SONAR sensor, a camera, and a proximity sensor.

7. The system of claim 1, wherein the logic executed by the one or more processors cause the system to output at least one of a notification to alert a user to a presence of the obstacle or a prompt with the display to prompt the user to confirm at least one of the presence of the obstacles or a type of obstacle.

8. A vehicle for detecting and mapping off-road obstacles, the vehicle comprising:
   one or more processors;
   one or more location sensors communicatively coupled to the one or more processors and configured to output a location signal indicative of a location of the vehicle;
   one or more vehicle telematics sensors communicatively coupled to the one or more processors and configured to output a telematics signal indicative of performance of the vehicle;
   a display communicatively coupled to the one or more processors and operable to display map data of the location of the vehicle;
   one or more off-road obstacle detection sensors communicatively coupled to the one or more processors and configured to output an obstacle signal indicative of a location of an obstacle; and
   one or more memory modules communicatively coupled to the one or more processors and that store logic that when executed by the one or more processors cause the vehicle to:
     receive the map data of the location of the vehicle;
     determine, based on the location of the vehicle, whether the vehicle is off-road;
     detect, based on the obstacle signal from the one or more off-road obstacle detection sensors, the obstacle in a vicinity of the vehicle in response to determining that the vehicle is off-road;
     determine, based on the obstacle signal, the location of the obstacle relative to the vehicle;
     generate a map indicator to indicate the obstacle;
     position the map indicator on the map data corresponding to the location of the obstacle;
     display a prompt on the display requesting that a user confirm presence of the obstacle;
     display the map indicator on the display corresponding to the location of the obstacle in response to the user confirming the presence of the obstacle; and
     store telematics data from the one or more vehicle telematics sensors in the one or more memory modules related to traversal of the obstacle by the vehicle in response to the user confirming the presence of the obstacle.

9. The vehicle of claim 8, wherein the logic executed by the one or more processors further cause the vehicle to identify a type of the obstacle detected.

10. The vehicle of claim 9, wherein the map indicator further indicates the type of the obstacle detected.

11. The vehicle of claim 8, further comprising network interface hardware communicatively coupled to the one or more processors, wherein the logic executed by the one or more processors causes the vehicle to communicate location information of the obstacle to a remote server.

12. The vehicle of claim 8, further comprising network interface hardware communicatively coupled to the one or more processors, wherein the logic executed by the one or more processors causes the vehicle to communicate location information of the obstacle through vehicle-to-vehicle communication.

13. The vehicle of claim 8, wherein the one or more off-road obstacle detection sensors is at least one of a LiDAR sensor, a SONAR sensor, a camera, and a proximity sensor.

14. The vehicle of claim 8, wherein the logic executed by the one or more processors cause the vehicle to output at least one of a notification to alert a user to a presence of the obstacle or a prompt with the display to prompt the user to confirm at least one of the presence of the obstacles or a type of obstacle.

15. A method for detecting and mapping off-road obstacles, the method comprising:
    receiving a map data of the location of the vehicle;
    determining a location of a vehicle based on a location signal output by one or more location sensors;
    detecting, based on an obstacle signal from the one or more off-road obstacle detection sensors, an obstacle in a vicinity of the vehicle in response to determining that the vehicle is off-road;
    generating a map indicator to indicate the obstacle;
    position the map indicator on the map data corresponding to the location of the obstacle;
    display a prompt on a display requesting that a user confirm presence of the obstacle; and
    displaying the map indicator on the display corresponding to the location of the obstacle in response to the user confirming the presence of the obstacle.

16. The method of claim 15, further comprising communicating location information of the obstacle to a remote server using network interface hardware.

17. The method of claim 15, further comprising at least one of outputting a notification to alert a user to a presence of the obstacle and outputting a prompt with the display to prompt the user to confirm at least one of the presence of the obstacle and a type of the obstacle.

18. The system of claim 1, wherein the logic executed by the one or more processors further cause the system to:
    store telematics data from one or more vehicle telematics sensors in the one or more memory modules related to traversal of the obstacle by the vehicle and indicating performance of the vehicle;
    link the telematics data to the map indicator;
    receive a user selection of the map indicator via one or more user input devices; and
    display the telematics data linked to the map indicator in response to the user selection of the map indicator.

19. The vehicle of claim 8, wherein the logic executed by the one or more processors further cause the vehicle to:
    link the telematics data to the map indicator, wherein the telematics data indicates performance of the vehicle;
    receive a user selection of the map indicator via one or more user input devices; and
    display the telematics data linked to the map indicator in response to the user selection of the map indicator.

20. The method of claim 15, further comprising:
    storing telematics data from one or more vehicle telematics sensors in one or more memory modules related to traversal of the obstacle by the vehicle and indicating performance of the vehicle;
    linking the telematics data to the map indicator;
    receiving a user selection of the map indicator via one or more user input devices; and display the telematics data linked to the map indicator in response to the user selection of the map indicator.

* * * * *

UNITED STATES PATENT AND TRADEMARK OFFICE
CERTIFICATE OF CORRECTION

| | |
|---|---|
| PATENT NO. | : 11,385,058 B2 |
| APPLICATION NO. | : 16/695892 |
| DATED | : July 12, 2022 |
| INVENTOR(S) | : Varun J. Prabhakar |

It is certified that error appears in the above-identified patent and that said Letters Patent is hereby corrected as shown below:

In the Claims

In Column 11, Line(s) 51, Claim 1, after "vehicle", delete ":" and insert --;--, therefor.

Signed and Sealed this
Thirty-first Day of October, 2023

Katherine Kelly Vidal
*Director of the United States Patent and Trademark Office*